(12) United States Patent
Yoon

(10) Patent No.: US 12,513,007 B2
(45) Date of Patent: Dec. 30, 2025

(54) METHOD OF MANAGING AUTHENTICATION INFORMATION OF CERTIFICATE INDEPENDENTLY OF CERTIFICATE AUTHORITY

(71) Applicant: Electronics and Telecommunications Research Institute, Daejeon (KR)

(72) Inventor: Daegeun Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 286 days.

(21) Appl. No.: 18/085,290

(22) Filed: Dec. 20, 2022

(65) Prior Publication Data

US 2023/0308296 A1 Sep. 28, 2023

(30) Foreign Application Priority Data

Mar. 10, 2022 (KR) .................. 10-2022-0030198

(51) Int. Cl.
*H04L 29/06* (2006.01)
*H04L 9/08* (2006.01)
*H04L 9/32* (2006.01)

(52) U.S. Cl.
CPC .......... *H04L 9/3268* (2013.01); *H04L 9/0825* (2013.01); *H04L 9/0861* (2013.01)

(58) Field of Classification Search
CPC .... H04L 9/3268; H04L 9/0825; H04L 9/0861
USPC ....................................................... 713/156
See application file for complete search history.

(56) References Cited

U.S. PATENT DOCUMENTS

| 10,771,249 B2 | 9/2020 | Park |
| 10,778,420 B2 | 9/2020 | Hong et al. |
| 2010/0122081 A1* | 5/2010 | Sato ...................... H04L 9/3263 713/158 |
| 2013/0156189 A1 | 6/2013 | Gero et al. |
| 2017/0026177 A1* | 1/2017 | Pilcher .................. H04L 9/0825 |
| 2017/0223054 A1* | 8/2017 | Wing ................... H04L 63/0281 |
| 2020/0394322 A1* | 12/2020 | Ramos .................... G06F 21/64 |

(Continued)

FOREIGN PATENT DOCUMENTS

| KR | 10-2267735 | 6/2021 |
| KR | 10-2323522 | 11/2021 |

(Continued)

OTHER PUBLICATIONS

Chuat et al., "SoK: Delegation and Revocation, the Missing Links in the Web's Chain of Trust", 2020 IEEE European Symposium on Security and Privacy (EuroS&P), 2020, pp. 624-638.

*Primary Examiner* — Jeffrey C Pwu
*Assistant Examiner* — Samuel Ambaye
(74) *Attorney, Agent, or Firm* — KILE PARK REED & HOUTTEMAN PLLC

(57) ABSTRACT

A method of managing authentication information of a certificate independently of a certificate authority (CA) is provided. The method includes issuing a certificate, into which identifier information instead of a public key is inserted, to an origin server by using the CA and reading an identifier document from an external storage by using user equipment on a basis of the identifier information received from the origin server and verifying the certificate with the public key included in the identifier document.

20 Claims, 14 Drawing Sheets

(56) References Cited

U.S. PATENT DOCUMENTS

2021/0126916 A1* 4/2021 Yang .................. G06Q 20/3829
2022/0167166 A1* 5/2022 Je ........................ H04L 63/0823
2023/0132505 A1* 5/2023 Lee ...................... H04L 9/3239
                                                                   713/156

FOREIGN PATENT DOCUMENTS

KR   10-2022-0006234   1/2022
KR   10-2022-0013328   2/2022

* cited by examiner

METHOD OF MANAGING AUTHENTICATION INFORMATION OF CERTIFICATE INDEPENDENTLY OF CERTIFICATE AUTHORITY

CROSS-REFERENCE TO RELATED APPLICATIONS

This application claims the benefit of the Korean Patent Application No. 10-2022-0030198 filed on Mar. 10, 2022, which is hereby incorporated by reference as if fully set forth herein.

BACKGROUND

Field of the Invention

The present invention relates to a method and system of managing authentication information, and more particularly, to a method and system of managing authentication information of a certificate, in which a certificate subject manages authentication information of a certificate by using a decentralized identifier (DID).

Discussion of the Related Art

Recently, a transport layer security (TLS) protocol based on a public key infrastructure (PKI) certificate is much being used as technology which exchanges an encrypted packet over a network. Particularly, the TLS protocol is essential for safely exchanging sensitive information through web browser in daily life.

On the other hand, a fundamental rule "a private key of own X.509 certificate should be safely kept without being exposed at the outside" is not observed in a current Internet environment using a content delivery network (CDN). Web service companies should delegate an authority to provide a service to the CDN so as to provide a service through the CDN.

However, recently, many web service companies are using the CDN, a minority of CDNs obtain and manage a private key of each of many service companies, and a situation occurs where a private key should be inevitably shared by CDNs in a process of delegating an authority on the basis of PKI and TLS handshake structure, causing various problems.

SUMMARY

An aspect of the present invention is directed to providing an independent authentication information management system and method using a DID, in which authentication information (for example, a private key requiring security) of a certificate subject may be managed independently of a CA by using the DID even without being exposed and an authentication authority may be delegated to a proxy even without exposing the private key, and thus, the certificate subject may be supported to autonomously manage its own private key without reissuing a certificate, thereby enabling the DID to instantaneously manage the authentication information.

To achieve these and other advantages and in accordance with the purpose of the invention, as embodied and broadly described herein, there is provided a method of managing authentication information of a certificate independently of a certificate authority (CA), the method including: issuing a certificate, into which identifier information instead of a public key is inserted, to an origin server by using the CA; and reading an identifier document from an external storage by using user equipment on a basis of the identifier information received from the origin server and verifying the certificate with the public key included in the identifier document.

According to an embodiment, the issuing of the certificate to the origin server may include: transferring the identifier information to the CA by using the origin server; verifying an ownership of the identifier information with the public key included in the identifier document from the external storage by using the CA, based on the identifier information; when the ownership of the identifier information is verified, inserting the identifier information into the certificate; and issuing the certificate, into which the identifier information is inserted, to the origin server.

According to an embodiment, the verifying of the ownership of the identifier information may include verifying the ownership of the identifier information with a public key specified in the identifier document.

According to an embodiment, the inserting of the identifier information may include inserting, instead of the public key, the identifier information into a Subject public key field of an X.509-based certificate.

According to an embodiment, the inserting of the identifier information may further include inserting type information, representing that the X.509-based certificate includes the identifier information instead of the public key, into a Public key algorithm field of the X.509-based certificate.

According to an embodiment, the identifier information may include URI information indicating the identifier document.

According to an embodiment, the external storage may include a decentralized storage based on a block chain.

According to an embodiment, the verifying of the certificate may include: transmitting a first message, representing that it is possible to verify the certificate, to the origin server by using the user equipment; transmitting a second message including the identifier information to the user equipment by using the origin server in response to the first message; reading an identifier document from the external storage by using the user equipment, based on the identifier information included in the second message; and verifying the certificate with the public key included in the identifier document by using the user equipment.

According to an embodiment, the first message may include a ClientHello message defined in The Transport Layer Security (TLS) Version 1.3, and the second message may include a ServerHello message defined in the TLS Version 1.3.

According to an embodiment, the method may further include: before the issuing of the certificate to the origin server, transferring software, managing the identifier document, to the external storage to install the software in the external storage by using the CA; generating the identifier document including the public key by using the origin server, based on a predetermined mode; performing verification on an ownership of a private key corresponding to the public key included in the identifier document received from the origin server by using the software installed in the external storage; and when the ownership of the private key is verified, registering the identifier document by using the software installed in the external storage.

According to an embodiment, the software may provide a create, read, update, and delete (CRUD) function on the identifier document.

According to an embodiment, the generating of the identifier document may include generating the identifier document including a first field for recording the public key, a second field for recording a modification authority of the identifier document, and a third field recording a URL of a web service provider.

According to an embodiment, the method may further include transferring a registration request message of the identifier document by using the origin server, between the generating of the identifier document and the performing the verification on the ownership of the private key corresponding to the public key included in the identifier document, wherein the registration request message may include a value where a hash value of the identifier document is signed with a private key corresponding to a public key specified in the identifier document.

In another aspect of the present invention, there is provided a method of managing authentication information of a certificate independently of a certificate authority (CA), the method including: issuing a certificate, into which a decentralized identifier (DID) instead of a public key is inserted, to an origin server by using the CA; reading a DID document from a block chain storage by using user equipment on a basis of the DID received from the origin server and verifying the certificate with the public key included in the DID document; transferring a message, issuing a request to add, modify, or delete a public key included in the DID document, to the block chain storage by using the origin server; and adding, modifying, or deleting the public key included in the DID document by using the block chain storage in response to the message.

According to an embodiment, the adding, modifying, or deleting the public key may include adding, modifying, or deleting the public key included in the DID document by using the block chain storage, based on software providing a create, read, update, and delete (CRUD) function on the DID document.

According to an embodiment, the DID may include a URI indicating a position of the public key.

In another aspect of the present invention, there is provided a system for managing authentication information of a certificate independently of a certificate authority (CA), the system including: an origin server configured to receive a certificate based on public key infrastructure (PKI), into which a decentralized identifier (DID) instead of a public key is inserted, from the CA; and a user equipment configured to read a DID document from a verifiable data registry (VDR) on a basis of the DID received from the origin server and verify the certificate with the public key included in the DID document.

According to an embodiment, the DID document may include a first field with the public key recorded therein, a second field with a modification authority of the identifier document recorded therein, and a third field with a URL of a web service provider recorded therein.

According to an embodiment, the DID document may include a URI indicating the DID document.

According to an embodiment, the DID document may include a URI indicating a position of the public key.

It is to be understood that both the foregoing general description and the following detailed description of the present invention are exemplary and explanatory and are intended to provide further explanation of the invention as claimed.

DETAILED DESCRIPTION OF THE INVENTION

Hereinafter, example embodiments of the invention will be described in detail with reference to the accompanying drawings. In describing the invention, to facilitate the entire understanding of the invention, like numbers refer to like elements throughout the description of the figures, and a repetitive description on the same element is not provided.

Figure 1:
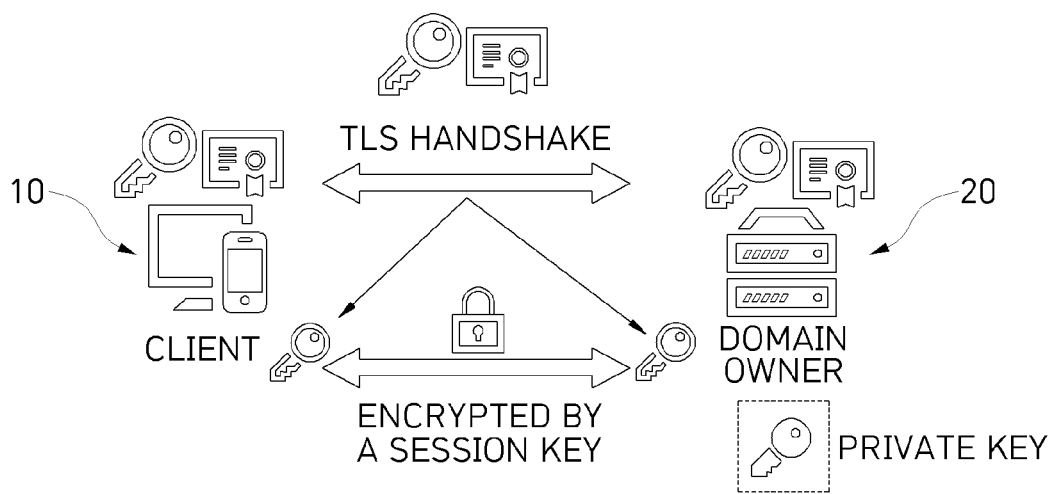
FIG. 1 is a conceptual diagram illustrating a TLS protocol operation process according to the related art.
Figure 2:
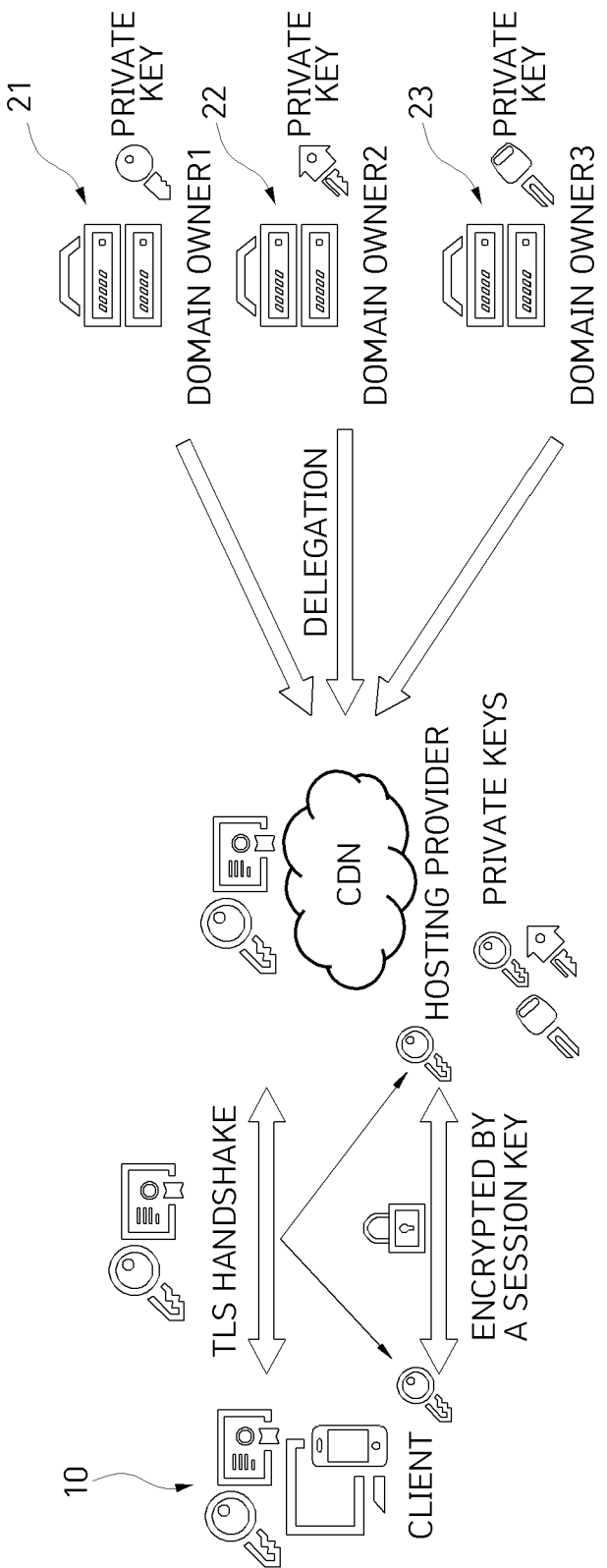
FIG. 2 is a conceptual diagram illustrating a TLS protocol operation process using a CDN according to the related art.
Figure 3:
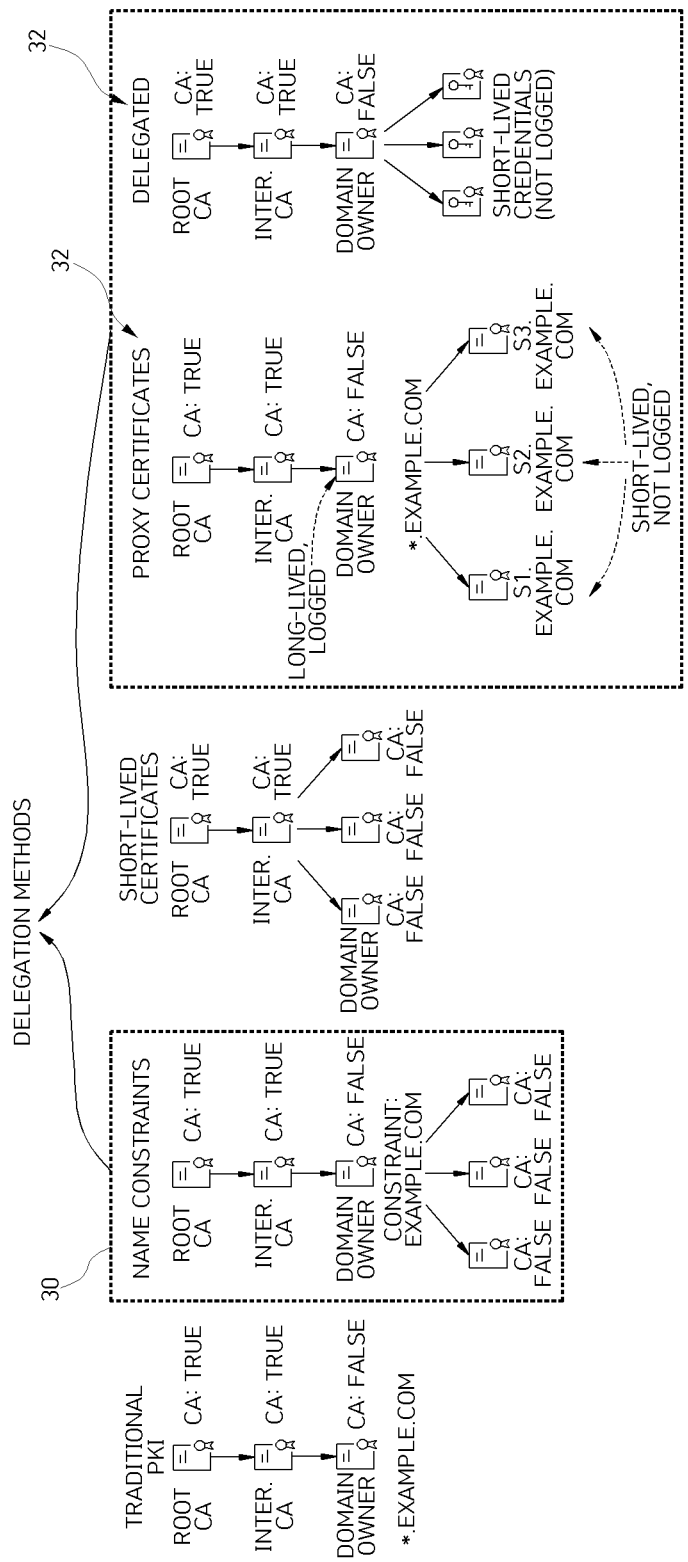
FIG. 3 is a conceptual diagram illustrating various certificate delegation methods for solving a problem in a PKI structure according to the related art.
Figure 4:
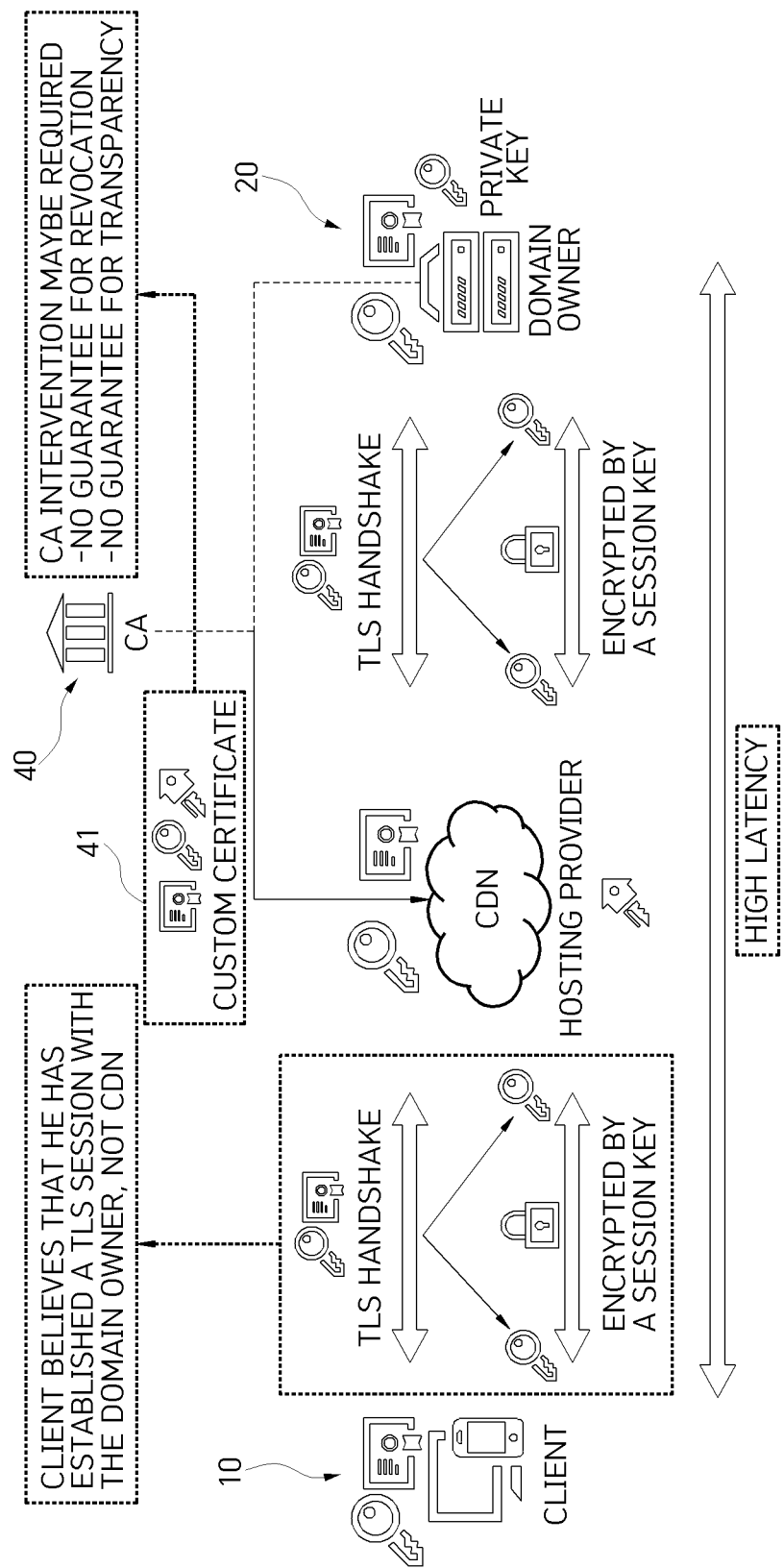
FIG. 4 is a conceptual diagram illustrating an SSL splitting operation process according to the related art.
Figure 5:
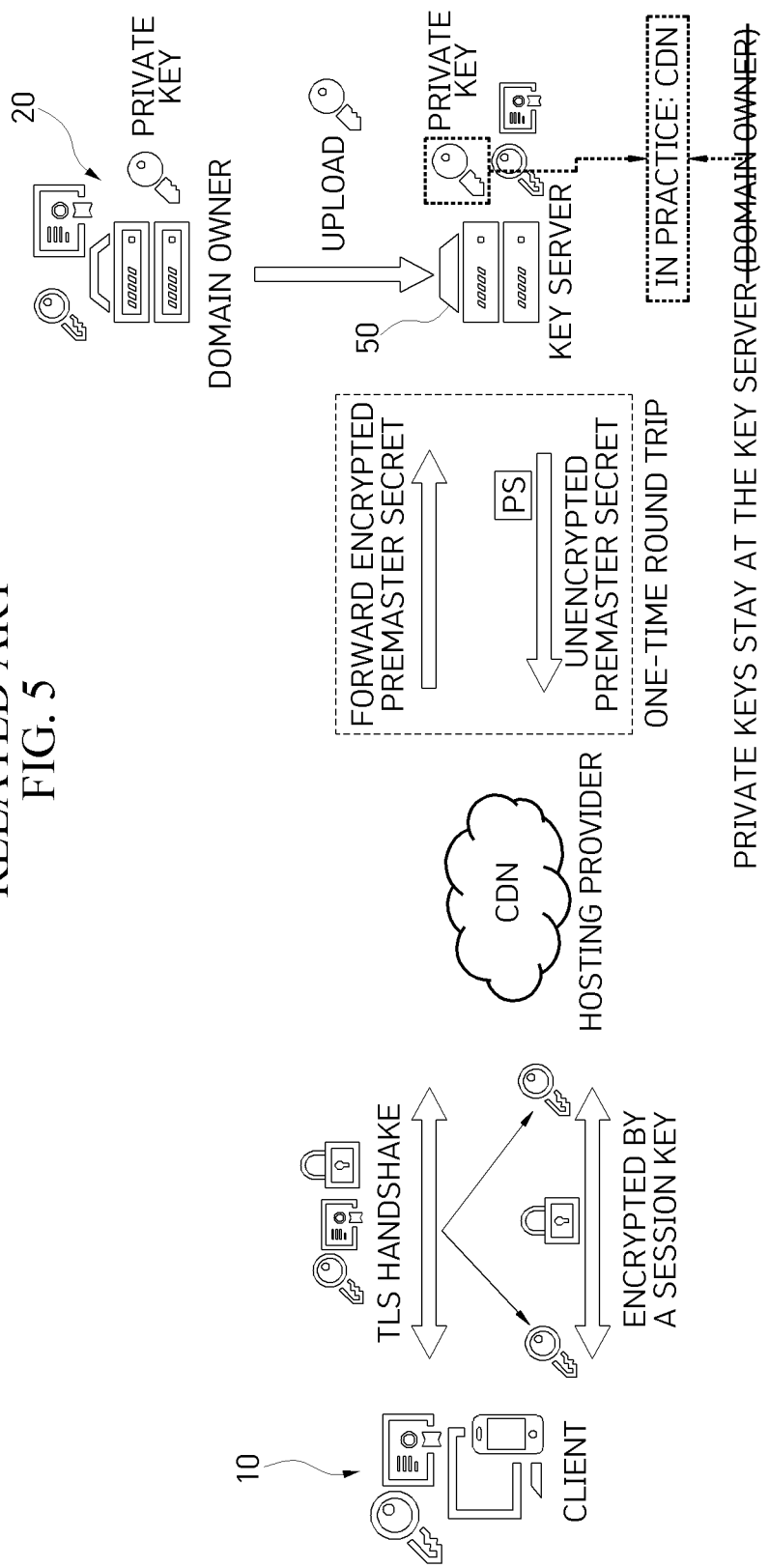
FIG. 5 is a conceptual diagram illustrating a keyless SSL operation process according to the related art.

FIG. 1 is a conceptual diagram illustrating a TLS protocol operation process according to the related art, FIG. 2 is a conceptual diagram illustrating a TLS protocol operation process using a CDN according to the related art, FIG. 3 is a conceptual diagram illustrating various certificate delegation methods for solving a problem in a PKI structure according to the related art, FIG. 4 is a conceptual diagram illustrating an SSL splitting operation process according to the related art, and FIG. 5 is a conceptual diagram illustrating a keyless SSL operation process according to the related art.

Referring to FIG. 1, a TLS protocol may include a TLS handshake process of checking, by a client 10 and a domain owner 20, a public key and an identity of a third party through PKI-based X.509 issued by a certificate authority (CA) and then exchanging a session key and a record process of performing encrypted communication by using the session key.

In the TLS handshake process, PKI-based X.509 certificate exchange may be essential, and a basic principle of PKI may be that a private key corresponding to an X.509 certificate should be safely kept by the domain owner 20 without absolutely being exposed at the outside.

However, such a basic principle may not be observed in a current Internet environment using a content delivery network (CDN). Web service companies may use a server which is provided by a CDN provider and is installed around the world, so as to provide a smooth service to the world. The web service companies should delegate an authority to provide a service to a CDN so as to provide a service through the CDN.

Recently, as illustrated in FIG. 2, many web service companies 21 to 23 may use a CDN, a minority of CDNs may obtain and manage a private key of each of the web service companies 21 to 23, and a situation may occur where a private key should be inevitably shared by CDNs in a process of delegating an authority on the basis of PKI and TLS handshake structure.

Due to this, issues have been proposed by researchers and companies from before several years, and various improvement research are being performed.

There are three methods for solving a problem in a PKI structure as in FIG. 3.

First, a name constraint method 30 may be a method where a domain owner (or a web service provider) obtains a CA authority to issue a certificate to issue a certificate to a proxy such as a CDN. However, a case where a web service provider performs a role of a CA may be a method which is not much used as a method which does not match a conventional PKI structure.

A proxy certificate method 32 may be a method where a domain owner does not have a CA authority but issues a separate X.509 certificate, which includes a delegation authority separately from a CA authority, to a proxy. However, the proxy certificate method 32 may be difficult to delete a proxy certificate and may issue an authority delegation certificate within only a domain which is allowed in Wildcard specified in a certificate.

Finally, a delegated credential method 32 may be an authority delegation method which is being developed as ietf standard Internet-draft and may be a standard which is being developed through cooperation in Cisco, Facebook, Cloudflare, and Mozilla. The delegated credential method 32 may provide a protocol which delegates an authority by using a separate certificate having a mode which differs from that of X.509, but may have a problem where it is unable to delete a certificate still.

Furthermore, there is a method which solves an authority delegation issue by using a protocol based on the PKI structure described above, and examples of the method may include the SSL splitting method and the keyless SSL method.

The SSL splitting method, as illustrated in FIG. 4, may be a protocol which issues a custom certificate 41 to a hosting provider such as a CDN through a connection between a web service provider (domain provider) 20 and the CA 40 and transfers traffic after separate TLS handshake is made between a service user (client) 10 and a service provide (domain owner) 20. However, such a method may correspond to a structure where the CDN provides a connection between the client and the domain owner and may not match the CDN which is used for enhancing performance.

Moreover, in a process of issuing a certificate to the CDN, the direct intervention of the CA 40 may be needed, and ensuring of transparency may not be provided on whether a user communicates with the CDN or directly communicates with the web service provider. Therefore, the SSL splitting method is not much used in the CDN market at present.

The keyless SSL method, as illustrated in FIG. 5, may be technology where the web service provider 20 safely keeps a private key to a key server 50 managed by the web service provider 20, and when the CDN request a decryption operation, which is needed only once, from the key server 50 in a handshake process performed on the user 10, the key server 50 decrypts corresponding data and return decrypted data to the CDN. Subsequently, the CDN may exchange a symmetric key with the user to safely provide, based on the decrypted data.

However, in the keyless SSL method, there may be a number of cases where the web service provider 20 does not manage the key server 50 and the CDN manages the key server 50, based on a system operating structure. Due to this, such a structure may be a structure where a basic principle of PKI "a private key should be managed by an owner" is still violated. Also, because the CDN uses a certificate of the web service provider 20 intactly, there may be a problem where transparency is not ensured on whether the user 10 communicates with the CDN still or communicates with the web service provider 20.

To date, the following security situation may be needed for solving the above-described authority delegation issue.

In technology which does not share (expose) a private key and safely delegates an authority, a PKI-based certificate may have a severe problem of delete technology as well as an authority delegation issue. The number of valid certificates of website currently used in Web may be about hundreds of millions, and a high delay time and a computing resource may be needed in a process where a web browser of the user 10 performs all valid verifications.

Therefore, recently, even when verification of certificate validity fails, a web browser may ignore a verification result and may a TLS handshake and symmetric key exchange process based on a TLS protocol (an operation performing a symmetric key exchange even when verification of validity fails may be referred to as soft-fail).

The reason that soft-fail occurs may be because a number of certificate delete lists should be managed and distributed by a minority of CAs and all of a certificate delete process and a certificate delete verification process depend on a minority of CAs. In order to solve such a problem, the following requirements may be needed.

There is technology which may manage and verify authentication information (a public key of a certificate subject) about the certificate subject independently of the CA.

The present invention may propose a method where a certificate subject may directly manage authentication information about the certificate subject independently of the CA by using an identifier (ID) indicating a position (address) of a public key such as a decentralized identifier (DID).

In the present invention, a certificate subject may use a DID so as to directly manage authentication information its own authentication information and may use all ID technologies representing a position (address) of a public key. Details of DID-based PKI certificate management technology according to the present invention will be described below.

A method which issues a certificate to a DID instead of directly inserting a public key into authentication information about a certificate subject in an X.509 certificate A DID-based X.509 verification method A method which safely delegates a PKI X.509 certificate authority without exposing a private key independently of a CA and deletes a delegation authority A method which rotates and deletes a key of a certificate subject of a PKI X.509 certificate independently of a CA A method which rotates a subject alternative names (SANs) list in a X.509 certificate independently of a CA Hereinafter, a method of directly managing, by a certificate subject, authentication information about the certificate subject independently of a CA according to an embodiment of the present invention will be described in detail.

Figure 6:
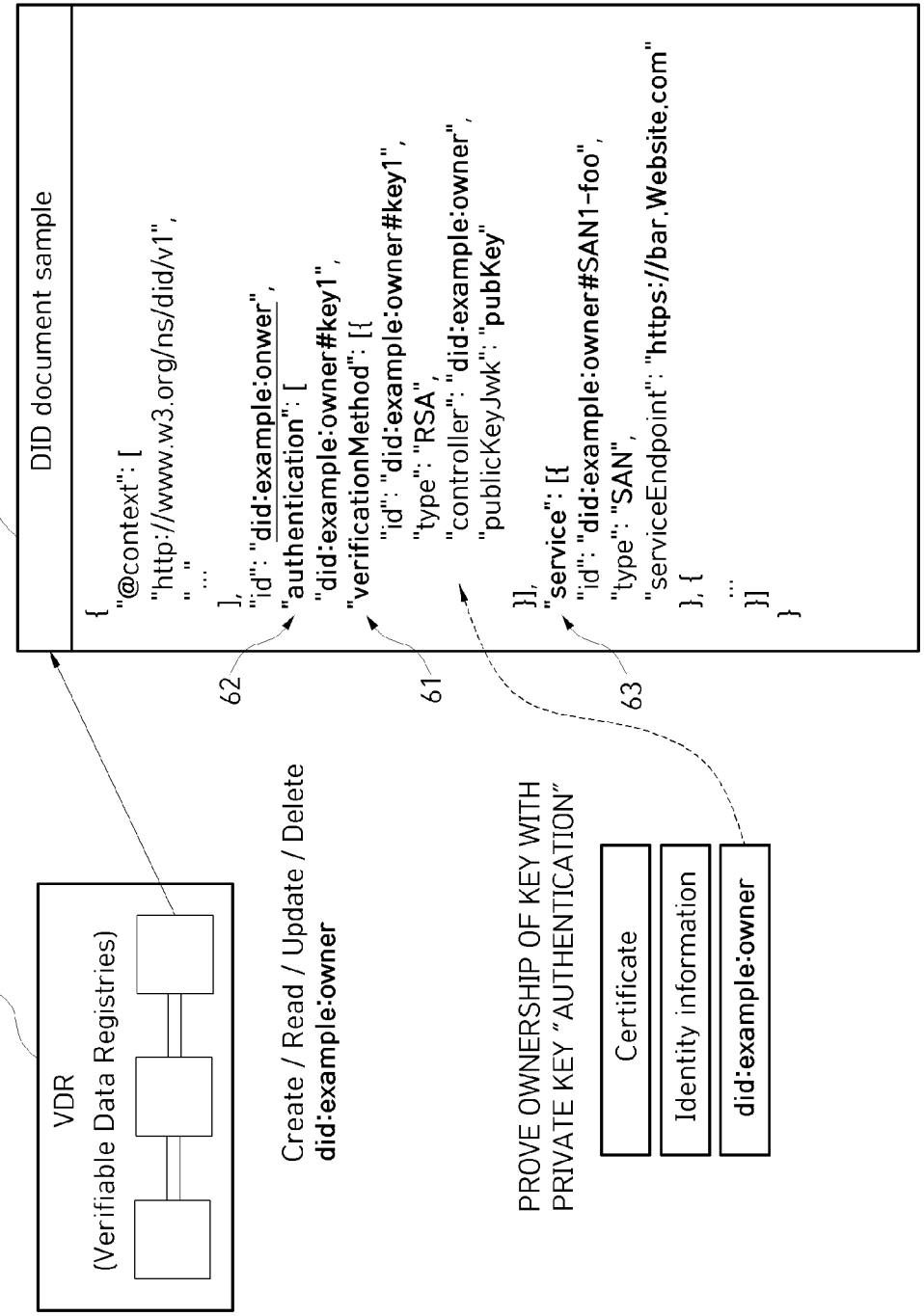
FIG. 6 is a diagram for describing a concept of a decentralized identifier (DID) and a DID document according to an embodiment of the present invention.

FIG. 6 is a diagram for describing a concept of a DID and a DID document according to an embodiment of the present invention.

Referring to FIG. 6, a DID may be a uniform resource identifier (URI) indicating a DID document. A certificate subject may generate a DID document 60 and an asymmetric key pair including a private key (or a secret key) and a public key first. In the present specification, a certificate subject may be an owner of a certificate and may be a domain owner or an origin server.

The certificate subject may safely keep the private key (or the secret key), generate the DID document 60, and input the public key to a verificationMethod field 61 of the DID document 60. Also, depending on the case, the certificate subject may add, to the DID document, an authentication field 62 representing an authentication means and a service field 63 representing an access point accessible to the certificate subject and may store the DID document 60, to which the fields 62 and 63 are added, in a VDR storage 63 for managing the DID document 60.

Subsequently, the certificate subject may input, instead of a public key of the certificate subject, a DID to a detailed field, to which the public key of the certificate subject is input, in the verificationMethod field 61 a case where a certificate (for example, an X.509 certificate) is issued, and in a case which applies the certificate later, verification of the certificate may be performed by a method which proves an ownership of the public key indicated by the DID instead of the public key included in the certificate. A verifier may read the DID document 60, indicated by the DID specified in the certificate, from the VDR storage 64 accessible by all persons, and then, may prove that the certificate subject own a private key corresponding to a method (public key) specified in the authentication field 62 of the DID document 60. A proof of possession (POP) of PKI specified in RFC 4210 standardized by Internet engineering task force (IETF) may be used for proving an ownership of the private key.

Figure 7:
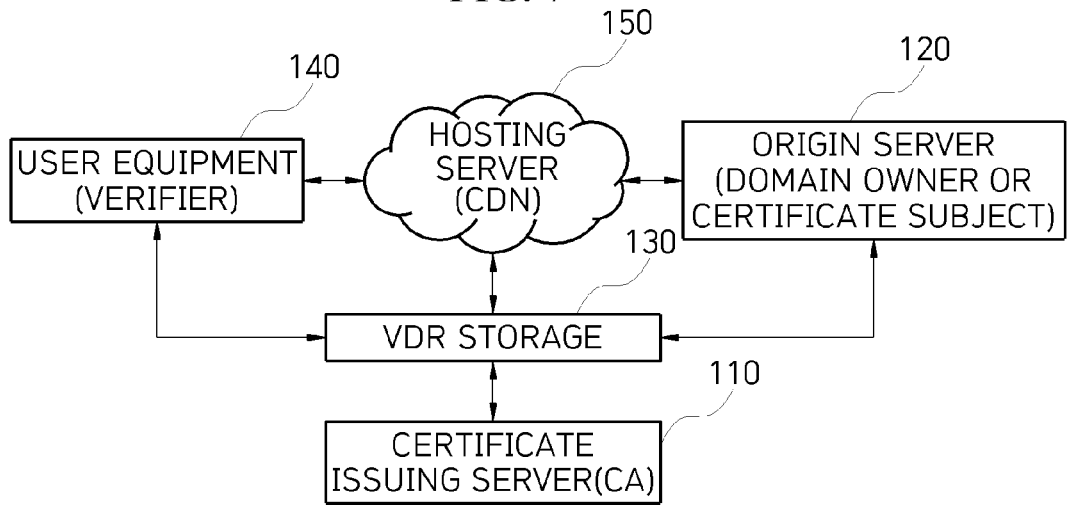
FIG. 7 is a diagram schematically illustrating a whole configuration of a system according to an embodiment of the present invention.

FIG. 7 is a diagram schematically illustrating a whole configuration of a system 100 according to an embodiment of the present invention.

Referring to FIG. 7, the system 100 according to an embodiment of the present invention may provide a method where a certificate subject manages its own authentication information of a certificate (for example, an X.509 certificate) by using a DID, independently of a certificate issuing server or a CA.

To this end, the system 100 according to an embodiment of the present invention may include a certificate issuing server (a CA) 110, an origin server 120, a VDR server 130, user equipment 140, and a hosting server 150.

The CA 110 may be a server which issues a certificate to the origin server 120. The origin server 120 may be a server to which the certificate is issued by the CA 100. In the present specification, the origin server 120 may be referred to as a certificate subject or a domain owner. The VDR storage 130 may be a device which stores the DID document so as to manage the DID document generated by the certificate subject 120. The user equipment 140 may be a device which verifies the certificate of the certificate subject, and for example, may include at least one of a smartphone, a tablet personal computer (PC), a mobile terminal, a video phone, an e-book reader, a desktop PC, a laptop PC, a netbook computer, a workstation, a server, a personal digital assistant (PDA), and a portable multimedia player (PDA). In the present specification, the user equipment 140 may be referred to as a verifier. The hosting server 150 may be a server which operates a CDN and may be referred to as a proxy, a proxy server, or a hosting provider which provides a hosting service. The hosting server 150 may have a DID ownership authority delegated from the certificate subject 120 which is the origin server 120.

Hereinafter, a method of managing, by the certificate subject 120, authentication information of a certificate (for example, an X.509 certificate) by using a DID independently of a CA on the basis of information exchange between the elements 110 to 150 will be described in detail.

Figure 8:
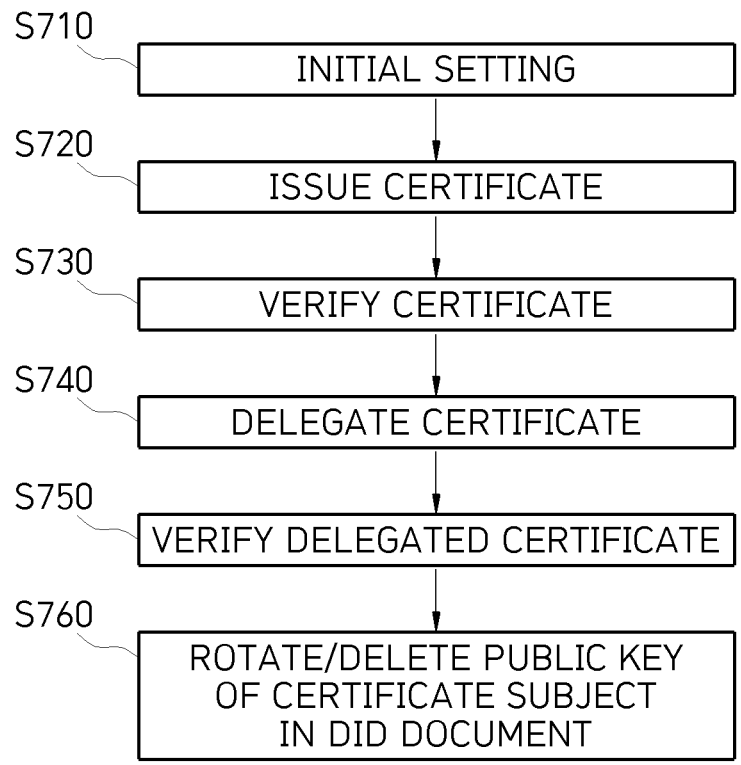
FIG. 8 is a flowchart illustrating a method of managing authentication information by using a certificate subject on the basis of a DID according to an embodiment of the present invention.

FIG. 8 is a flowchart illustrating a method of managing authentication information by using a certificate subject on the basis of a DID according to an embodiment of the present invention.

Referring to FIG. 8, a method of managing, by the certificate subject 120, authentication information of a certificate (for example, an X.509 certificate) by using a DID independently of a CA may be subdivided into an initial setting step S710, a certificate issuing step S720, a certificate verification step S730, a certificate delegation step S740, and a delegated certificate verification step S750, and moreover, may further include a step S760 of rotating/deleting a public key of a certificate subject and rotating a SANs list.

Initial Setting Step S710

Figure 9:
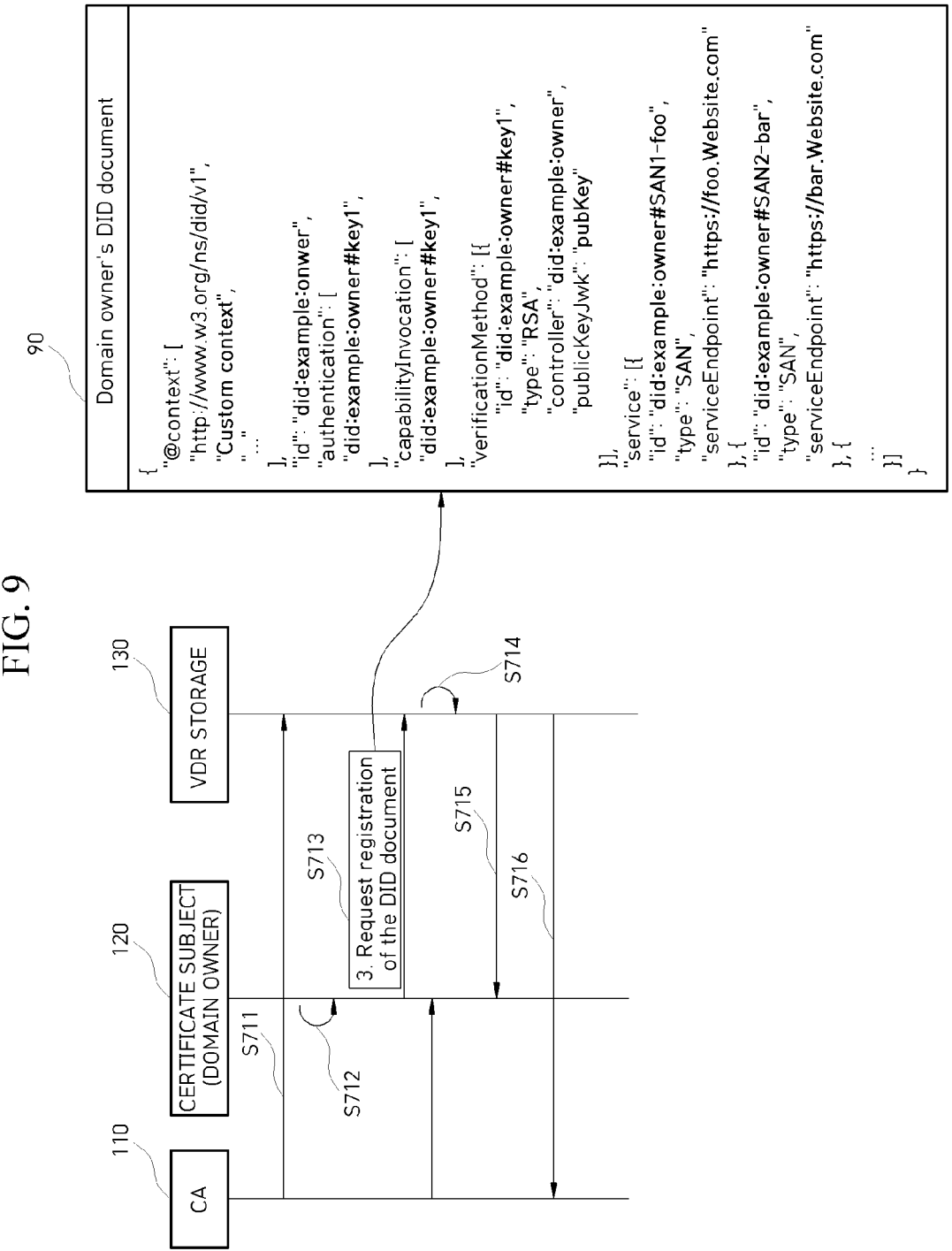
FIG. 9 is a flowchart of a message or information exchanged in a communication process between a certificate authority (CA), a certificate subject, and a verifiable data registries (VDR) storage in an initial setting step illustrated in FIG. 8.

FIG. 9 is a flowchart of a message or information exchanged in a communication process between a CA, a certificate subject, and a VDR storage in an initial setting step illustrated in FIG. 8.

Referring to FIG. 9, a certificate subject 120 may denote an origin server or a domain owner illustrated in FIG. 7. The initial setting step S710 may be subdivided into six steps S711 to S716.

First, in step S711, a process of transmitting, to a VDR storage 130, a DID contract manager for managing a DID document 190 by using a CA 110 may be performed. Such a process may be a process of installing the DID contract manager. The VDR storage 130 may be a decentralized storage or a distributed storage, and for example, may be a block chain or an InterPlanetary file system (IPFS). The VDR storage 130 may be a storage capable of being accessed by an arbitrary subject (the CA 110, the certificate subject 120, or a verifier (the user equipment 140 and the hosting server 150 of FIG. 7) which reliably manages the DID document 90 and needs to use a certificate. The DID contract manager may be software (SW) where a subject using a certificate provides a create, read, update, and delete (CRUD) function on the DID document 90. Also, the DID contract manager may provide a desired function (for example, a verification function) in associated with cost calculation or a DID document which occurs whenever the DID document 190 is generated.

Subsequently, in step S712, a process of generating, by the certificate subject, the DID document 90 on the basis of a predetermined mode and inputting (recording) an asymmetric key pair, which is to be used for proof of ownership of DID, to a verificationMethod field of the generated DID document 90. Here, the asymmetric key pair may include a public key and a private key (security key). The DID document 90 based on the predetermined mode may include the verificationMethod field for inputting (inserting) the public key of the certificate subject 120, an authentication field for recording a key used for authentication among public keys defined in the verificationMethod field, and a capabilityInvocation field for recording a modification authority of the DID document. Also, the DID document 90 may further include a service field and a serviceEndpoint field which is a detailed item of the service field, and an URL of a web service provider may be recorded in the serviceEndpoint field. As described above, according to an embodiment of the present invention, the URL of the web service provider may be input to the serviceEndpoint field of the DID document 90 instead of a SANs list defined in a PKI X.509 certificate.

Subsequently, in step S713, the certificate subject 120 may transmit a message, requesting registration of the DID document 90, to the VDR storage 130. According to an embodiment of the present invention, a registration request message of the DID document 90 may include a value, where a hash value of the DID document 90 is signed with a private key corresponding to a public key specified in the capabilityInvocation field, and data such as domain name system security extensions (DNSSEC). Here, the value signed with the private key may be data needed for claiming an ownership of the private key.

Subsequently, in step S714, a DID contract manager installed in the VDR storage 130 may perform verification on an ownership of the private key, corresponding to a public key specified in the capabilityInvocation field of the DID document 90, and an ownership of domains of a SANs list specified in the service field of the DID document 90.

In order to verify (prove) an ownership of the private key, an appropriate method selected from among general methods of proving an ownership of a private key, such as a method such as POP specified an RFC 4210, a challenge & response method, and a method of hashing the DID document 90 to verify a value signed with a private key with a private key, may be used. Also, in order to verify (prove) an ownership of the private key, all conventional methods such as DNSSEC, email, direct visit, and telephone may be used in verifying an ownership of domains.

In addition, the DID contract manager may further have a cost charge function needed in registering the DID document and may be affiliated with an external payment service.

Subsequently, in step S715, the VDR storage 130 may transfer a verification result and a registration result of the DID document 90 to the certificate subject 120, and depending on the case, may transfer a verification result and a registration result of the DID document 90 to the CA 110 also.

Certificate Issuing Step S720

Figure 10:
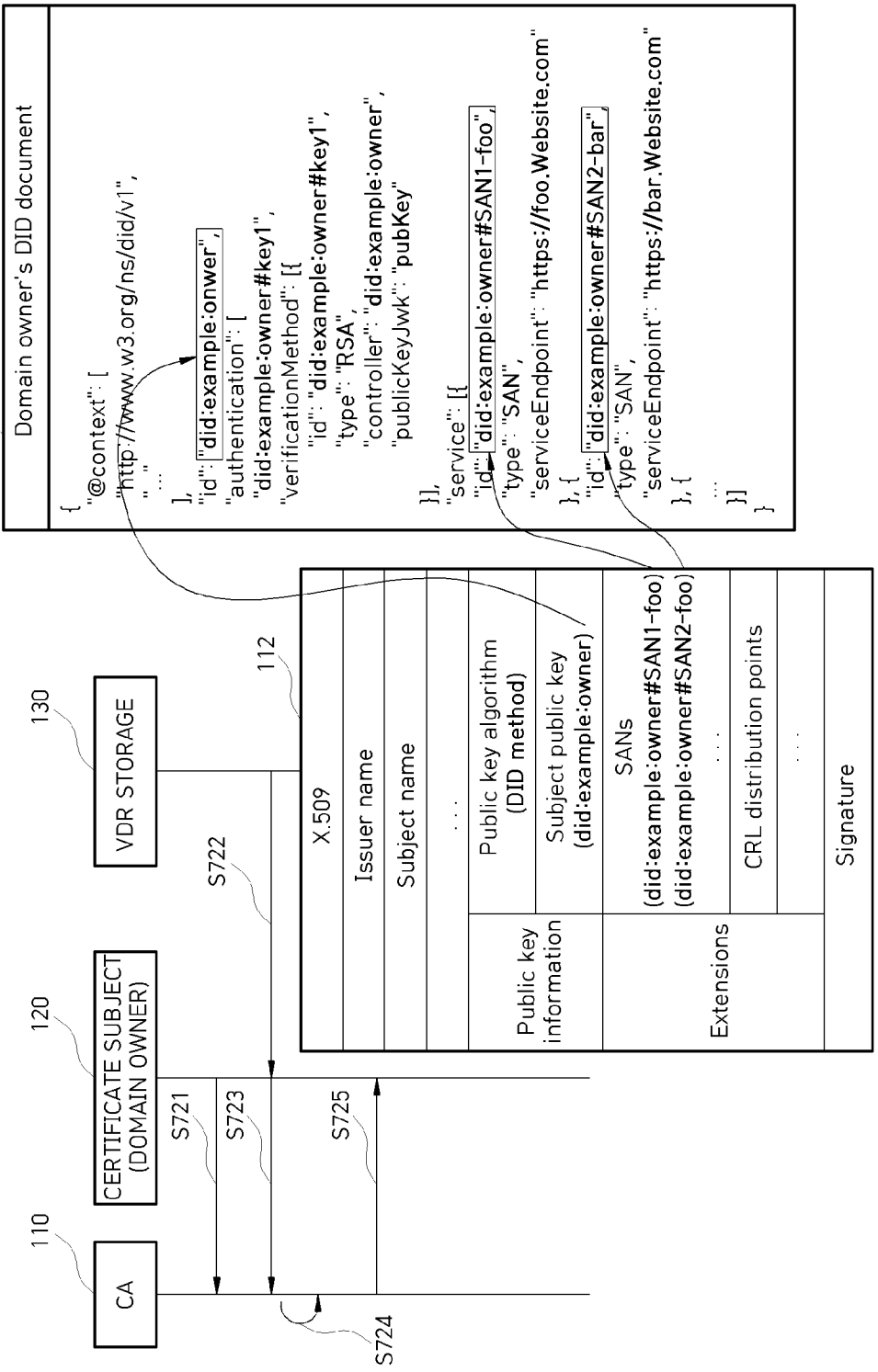
FIG. 10 is a flowchart of a message or information exchanged in a communication process between a CA, a certificate subject, and a VDR storage in a certificate issuing step illustrated in FIG. 8.

FIG. 10 is a flowchart of a message or information exchanged in a communication process between a CA 110, a certificate subject 120 (domain owner or origin server), and a VDR storage 130 in the certificate issuing step illustrated in FIG. 8.

Referring to FIG. 10, the certificate issuing step S720 may be a process of submitting, by a certificate subject 120, a DID instead of a public key to obtain an issued certificate (for example, a public key-based certificate or an X.509-based certificate). The certificate issuing step according to an embodiment of the present invention may include the following processes S721 to S724.

First, in step S721, the certificate subject 120 may transmit a certificate issuing request message which requests the issuing of the certificate from the CA 110. According to an embodiment of the present invention, the certificate issuing request message may include a DID of the certificate subject 120, data for proving an ownership of a SANs list, and certificate subject information. The data for proving an ownership of the SANs list may be generated by using POP, challenge & response, and/or DNSSEC, and such a generating process may be further performed before transmitting the certificate issuing request message. The certificate subject information may be metadata representing an attribute of a domain owner. According to an embodiment of the present invention, the certificate issuing request message may be replaced with a certificate signing request (CSR) used in conventional PKI, for compatibility with a conventional PKI infrastructure.

Subsequently, in step S722, the CA 110 may check the DID included in the certificate issuing request message received from the certificate subject 120, and then, may read a DID document of the certificate subject 120, corresponding to the checked DID, from VDR storage 130.

Subsequently, in step S723, the CA 110 may transfer the DID document 90, read from the VDR storage 130, to the CA 110.

Subsequently, in step S724, the CA 110 may verify an ownership of the DID. The verification of an ownership of the DID according to an embodiment of the present invention may be performed based on a public key specified in the capabilityInvocation field or the authentication field of the DID document 90. A verification method according to an embodiment of the present invention may be an appropriate method selected from among general methods of proving an ownership of a private key, such as a method such as POP specified an RFC 4210 and a challenge & response method. According to an embodiment of the present invention, when the certificate subject 120 desires that a SANs list is included in the certificate 112, the CA 110 may further perform verification (proof) on an ownership of a domain indicated by the service field and the serviceEndpoint field of the DID document 90. In order to verify (prove) an ownership of the domain, all conventional methods such as DNSSEC, email, direct visit, and telephone may be used in verifying an ownership of domains.

Subsequently, in step S725, the CA 110 may issue a certificate 112 to the certificate subject 120. In detail, when the CA 110 checks an ownership of a DID of the certificate subject 120, the DID instead of a public key may be input to a Subject public key field of the certificate 112, and information (i.e., a DID method or DID type information representing a DID-based certificate) representing that the certificate 112 includes the DID instead of the public key may be input to a Public key algorithm field of the certificate 112. Also, instead of inputting a URL of the certificate subject 120 to a SANs field of the certificate 112, an ID of a service item may be input to a serviceEndpoint field of the DID document 90. Subsequently, a corresponding certificate 112 which is generated as an input of information by the CA 110 is completed may be issued to the CA 120.

Certificate Verification Step S730

Figure 11:
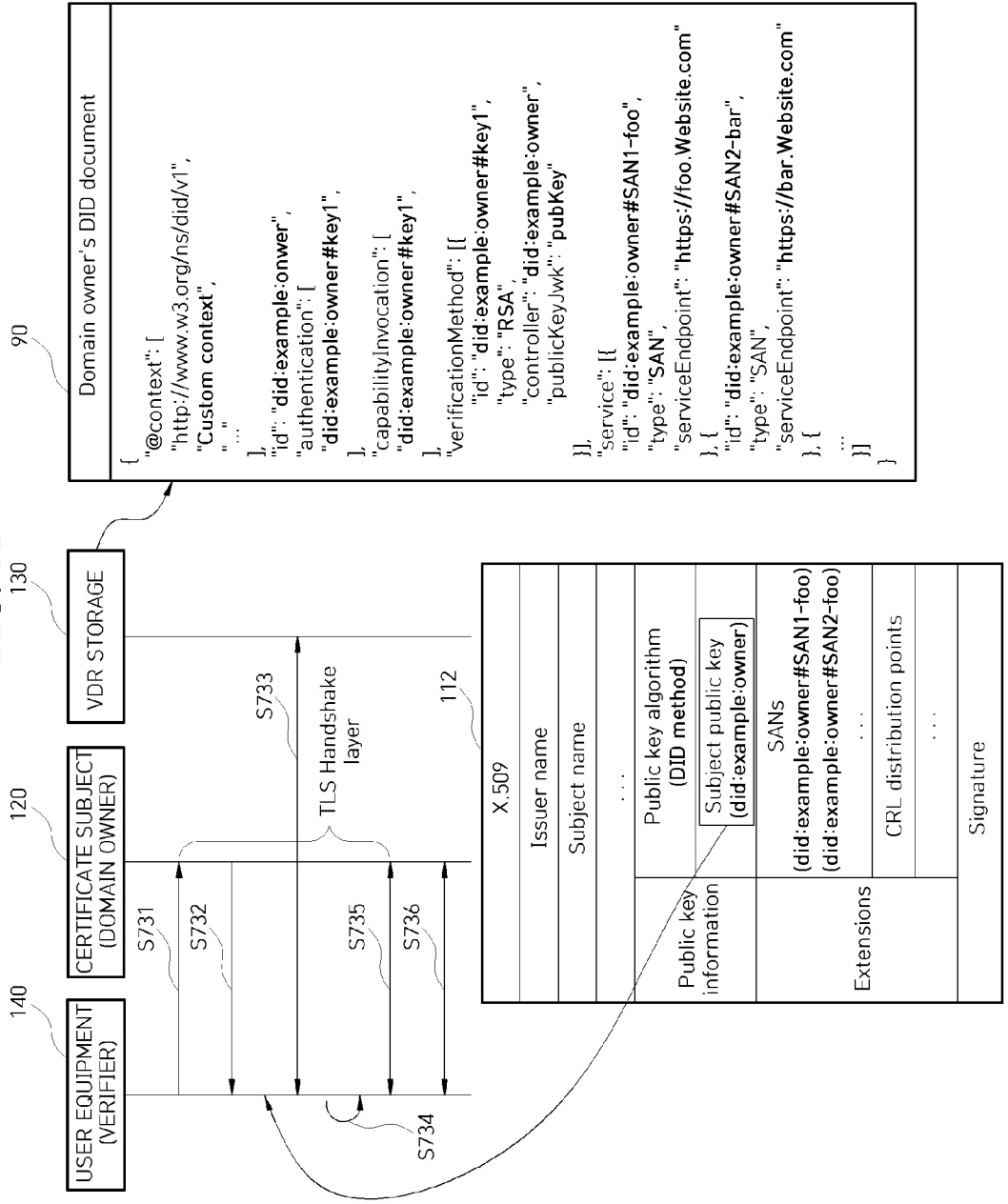
FIG. 11 is a flowchart of a message or information exchanged in a communication process between a certificate subject, user equipment, and a VDR storage in a certificate verification step illustrated in FIG. 8.

FIG. 11 is a flowchart of a message or information exchanged in a communication process between a certificate subject, user equipment, and a VDR storage in a certificate verification step illustrated in FIG. 8.

Referring to FIG. 11, the certificate verification step may be a process of notifying (ClientHello message), by user equipment (verifier or client) 140, a certificate subject that it is possible to verify the DID-based certificate 112 and transferring, by the certificate subject 120, data and the DID needed for verification to verify the certificate 112. A certificate verification process according to an embodiment of the present invention may include the following six steps S731 to S736. The certificate verification process according to an embodiment of the present invention is described based on a TLS handshake process of The Transport Layer Security (TLS) Version 1.3 (RFC 8446), but may be applied to all protocols authenticated through an X.509 certificate.

First, in step S731, when a verifier 140 is initially connected to the certificate subject 120, a ClientHello message defined in TLS Version 1.3 may be transmitted to a TLS message. The ClientHello message defined in TLS Version 1.3 may include an Extension field and a SignatureSchemeList field included in the Extension field. The SignatureSchemeList field may include a signature verification algorithm which is supported by the verifier 140, and the verifier 140 may add a DID-related function by using Reserved Code Points of SignatureSchemeList. In an embodiment of the present, it may be assumed that DID_rsa_sha2 is added. Subsequently, the verifier 140 may transmit ClientHello, including corresponding SignatureSchemeList, to the certificate subject 120.

Subsequently, in step S732, the certificate subject 120 may check that the verifier 140 supports DID_rsa_sha2 on the basis of SignatureSchemeList included in ClientHello received from the verifier 140. Subsequently, the certificate subject 120 may generate the ServerHello message defined in TLS Version 1.3 and may transmit the ServerHello message to the verifier 140. A cipher_suite field may be in the ServerHello message, and the certificate subject 120 may input did:example:owner #key1, indicating a position of a key supporting RSA among keys thereof, to the cipher_suite field. Also, the certificate subject 120 may input a CertVerify value (CertificateVerify value), defined in TLS Version 1.3, to the ServerHello message. The CertVerify value or the CertificateVerify value may be a value where the ClientHello message and the ServerHello message is signed with a private key corresponding to a public key of a certificate. In a case where the certificate subject 120 transmits a DID instead of the public key of the certificate, a corresponding message may be signed with a private key which is generated in generating a DID and a DID document. In an embodiment of the present invention, a CertVerify value may be generated with a private key corresponding to a public key placed in did:example:owner #key1 specified in a capabilityInvocation field of the DID document 90. Subsequently, the other desired values may be input to the ServerHello message, and then, the ServerHello message may be transmitted to the verifier 140.

Subsequently, in step S733, the verifier 140 may check DID information (did:example:owner #key1) included in the ServerHello message received from the certificate subject 120, and then, may read the DID document 90 of the certificate subject 120, corresponding to the checked DID information, from the VDR storage 130.

Subsequently, in step S734, the verifier 140 may verify the certificate 112 (an ownership of the DID) of the certificate subject 120 by using a public key included in the DID document 90 read from the VDR storage 130, and when a DID indicating serviceEndpoint is in a SANs item specified in the certificate 112, the verifier 140 may check a URL of corresponding serviceEndpoint to check that normal website is accessed.

Subsequently, in step S735, when the verifier 140 checks identity of the certificate subject 120 through the X.509 certificate 112, the verifier 140 may generate a symmetric key on the basis of the TLS protocol and may transfer the generated symmetric key to the certificate subject 120 to share the symmetric key.

Subsequently, in step S736, the verifier 140 and the certificate subject 120 sharing the symmetric key may perform a record layer process of performing encryption communication based on the symmetric key.

Certificate Delegation Step S740

Figure 12:
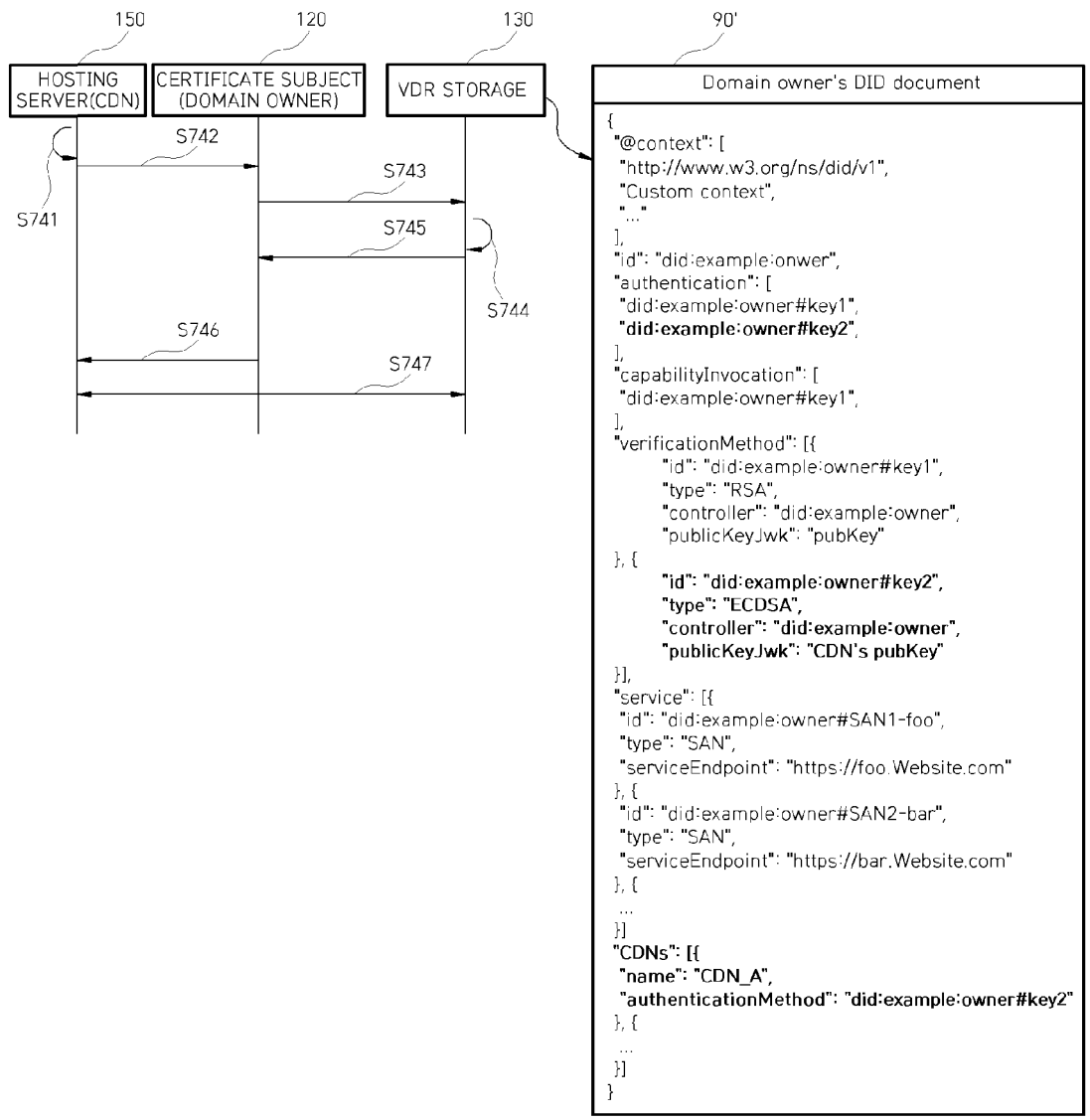
FIG. 12 is a flowchart of a message or information exchanged in a communication process between a hosting server, a certificate subject, and a VDR storage in a certificate delegation step illustrated in FIG. 8.

FIG. 12 is a flowchart of a message or information exchanged in a communication process between a hosting server, a certificate subject, and a VDR storage in the certificate delegation step illustrated in FIG. 8.

Referring to FIG. 12, a certificate delegation process may be a process of generating, by a hosting server 150 (hereinafter referred to as a proxy), a key pair having a delegation authority, transferring the symmetric key to the certificate subject 120, and adding, by the certificate subject 120, a public key of the proxy 150 to the DID document of the certificate subject 120 to delegate a DID ownership authority. A certificate delegation process according to an embodiment of the present invention will be described below.

First, in step S741, the proxy 150 may generate a key pair for exercising a delegation authority.

Subsequently, in step S742, the proxy 150 may transfer a message, requesting a delegation authority, to the certificate subject 120. Here, the message requesting the delegation authority may include a public key included in the generated key pair, and depending on the case, may further include data for proving an ownership of a private key corresponding to the public key and/or metadata corresponding to the public key and the proxy 150.

Subsequently, in step S742, the certificate subject 120 may add a DID (did:example:owner #key2), indicating the public key of the proxy 150, to a verificationMethod field of the DID document 90 indicated by a DID of the certificate, add the DID (did:example:owner #key2), indicating the public key of the proxy 150, to an authentication field of the DID document 90, and transfer a modified DID document 90' to the VDR storage 130. At this time, the certificate subject 120 may not directly modify the DID document 90, and the VDR storage 130 may modify the DID document 90. In this case, the certificate subject 120 may transfer the public key of the proxy 150 to the VDR storage 130, and the VDR storage 130 may add the DID (did:example:owner #key2), indicating the public key of the proxy 150, to the verificationMethod field and the authentication field of the DID document 90, thereby modifying the DID document 90.

Subsequently, in step S744, a DID contract manager installed in the VDR storage 130 may perform verification on an ownership of a DID with a key specified in the verificationMethod field of the modified DID document 90' transferred from the certificate subject 120. Also, the DID contract manager may verify an ownership of the DID, and then, may specify a key position indicating an authentication means of a proxy and meta information about the proxy which delegates an authority to a CDNs field of the DID contract manager.

Subsequently, in step S745, the DID contract manager may transfer a verification result to the certificate subject 120.

Subsequently, in step S746, the certificate subject 120 may transfer a delegation result and an X.509 certificate of the certificate subject 120 to the proxy 150.

In step S747, the proxy 150 may read the DID document 90', indicated by a DID specified in a Subject Public Key field of the certificate transferred from the certificate subject 120, from the VDR storage 130 to determine whether its own public key and meta information are added to the DID document 90'.

Delegated Certificate Verification Step S750

Figure 13:
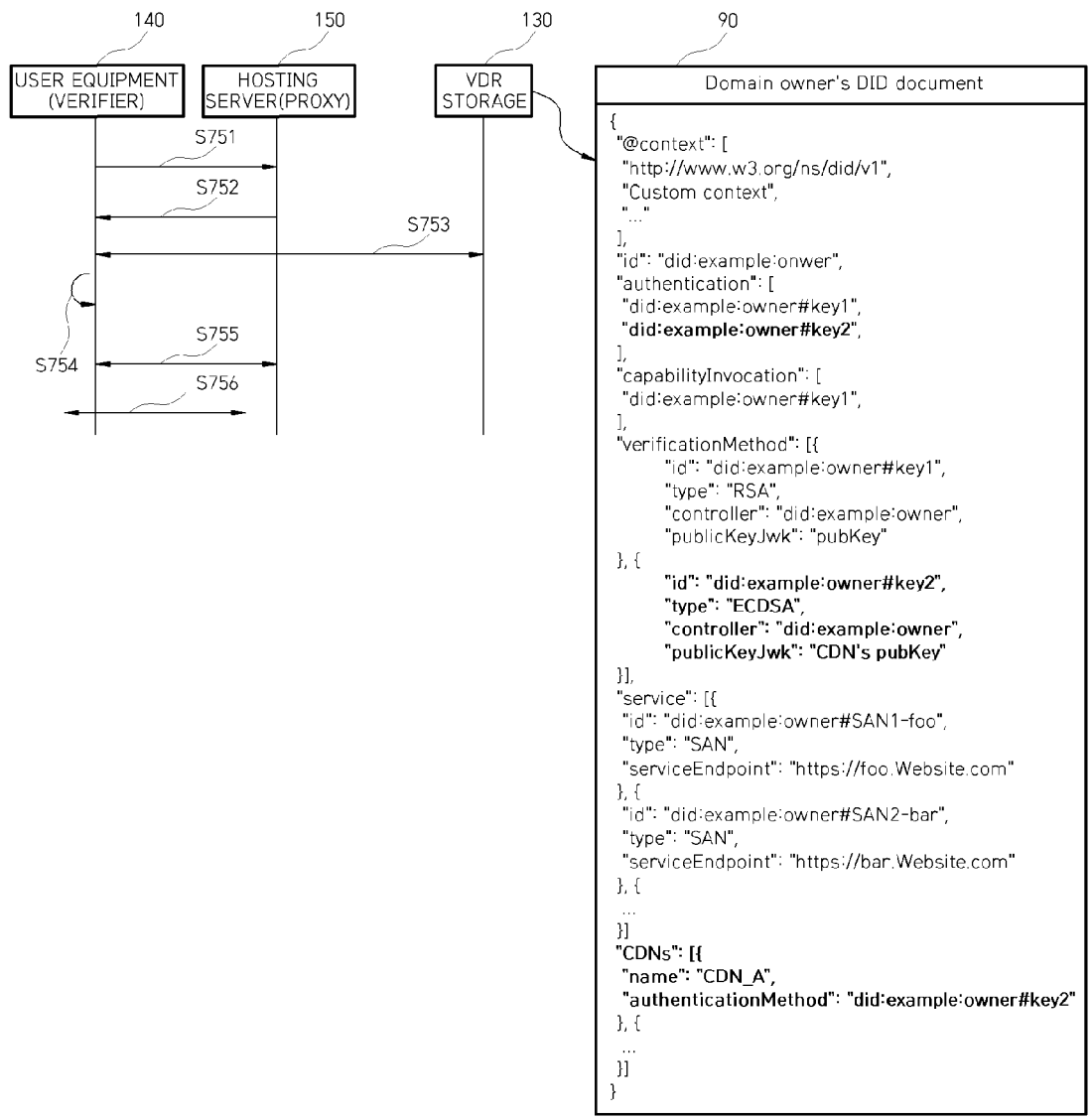
FIG. 13 is a flowchart of a message or information exchanged in a communication process between user equipment, a hosting server, and a VDR storage in a delegated certificate verification step illustrated in FIG. 8.

FIG. 13 is a flowchart of a message or information exchanged in a communication process between user equipment, a hosting server, and a VDR storage in a delegated certificate verification step illustrated in FIG. 8.

Referring to FIG. 13, the delegated certificate verification step S750 may be similar to the previously performed certificate verification step S730. A proxy (user equipment) 140 may specify supporting of a DID in a ClientHello message defined in a TLS handshake process of TLS Version 1.3 (RFC 8446), specify a DID of a key, which is used when an authority is delegated to a proxy 150, in a ServerHello message, and transfer the DID-specified messages. Subsequently, except for that CDN data of a CDNs item is checked, a verification process may be the same as a general certificate verification process.

In detail, in step S751, a signature verification algorithm supported by a verifier (user equipment) 140 may be included in a SignatureSchemeList field which is in an Extension field of a ClientHello message defined in TLS Version 1.3, and the verifier 140 may add a DID-related function to the ClientHello message by using Reserved Code Points of SignatureSchemeList. In the present embodiment, it may be assumed that DID_ec_sha2 representing the DID-related function is added to the ClientHello message. Subsequently, the verifier 140 may transmit the ClientHello message, including corresponding SignatureSchemeList, to the proxy 150.

Subsequently, in step S752, the proxy 150 may check that the verifier 140 supports DID_ec_sha2, based on SignatureSchemeList included in the ClientHello message received from the verifier 140. Subsequently, the proxy 150 may generate a ServerHello message defined in TLS Version 1.3 and may transfer the ServerHello message to the verifier 140. A cipher_suite field may be in the ServerHello message, and the verifier 150 may input "did:example:owner #key2", indicating a position of a key supporting EC among keys thereof, to the cipher_suite field. Also, the verifier 140 may input a CertVerify value (Certificate Verify value), defined in TLS Version 1.3, to the ServerHello message. The CertVerify value (Certificate Verify value) may be a value for signing ClientHello and ServerHello with a private key corresponding to a public key which is in a certificate, and in a case where a DID is transferred instead of the public key of the certificate, a corresponding message may be signed with a private key which is generated in generating the DID. In an embodiment of the present invention, the CertVerify value may be generated with a private key corresponding to a public key placed in did:example:owner #key2. Subsequently, the proxy 150 may input the other desired values to the ServerHello message, and then, may transfer the ServerHello message to the verifier 140.

Subsequently, in step S753, the verifier 140 may read a DID document 90, placed in a DID (did:example:owner #key2) included in the ServerHello message, from the VDR storage 130.

Subsequently, in step S754, the verifier 140 may determine that communication with the proxy 150 is being performed, based on a CDNs item of the DID document 90. The verifier 140 may verify identity of the proxy 150 and an ownership of the DID by using a public key included in the DID document 90. Also, when a DID indicating serviceEndpoint is in a SANs item of the certificate, the verifier 140 may check a URL of corresponding serviceEndpoint to determine that normal website is accessed.

Subsequently, in step S755, when identity of the proxy 150 is checked based on an X.509 certificate, the verifier 140 may generate a symmetric key on the basis of a TLS protocol and may share the generated symmetric key with the proxy 150.

Subsequently, in step S756, the verifier 140 and the proxy 150 may share the symmetric key, and then, may perform a record layer process of performing encryption communication based on the shared symmetric key.

Figure 14:
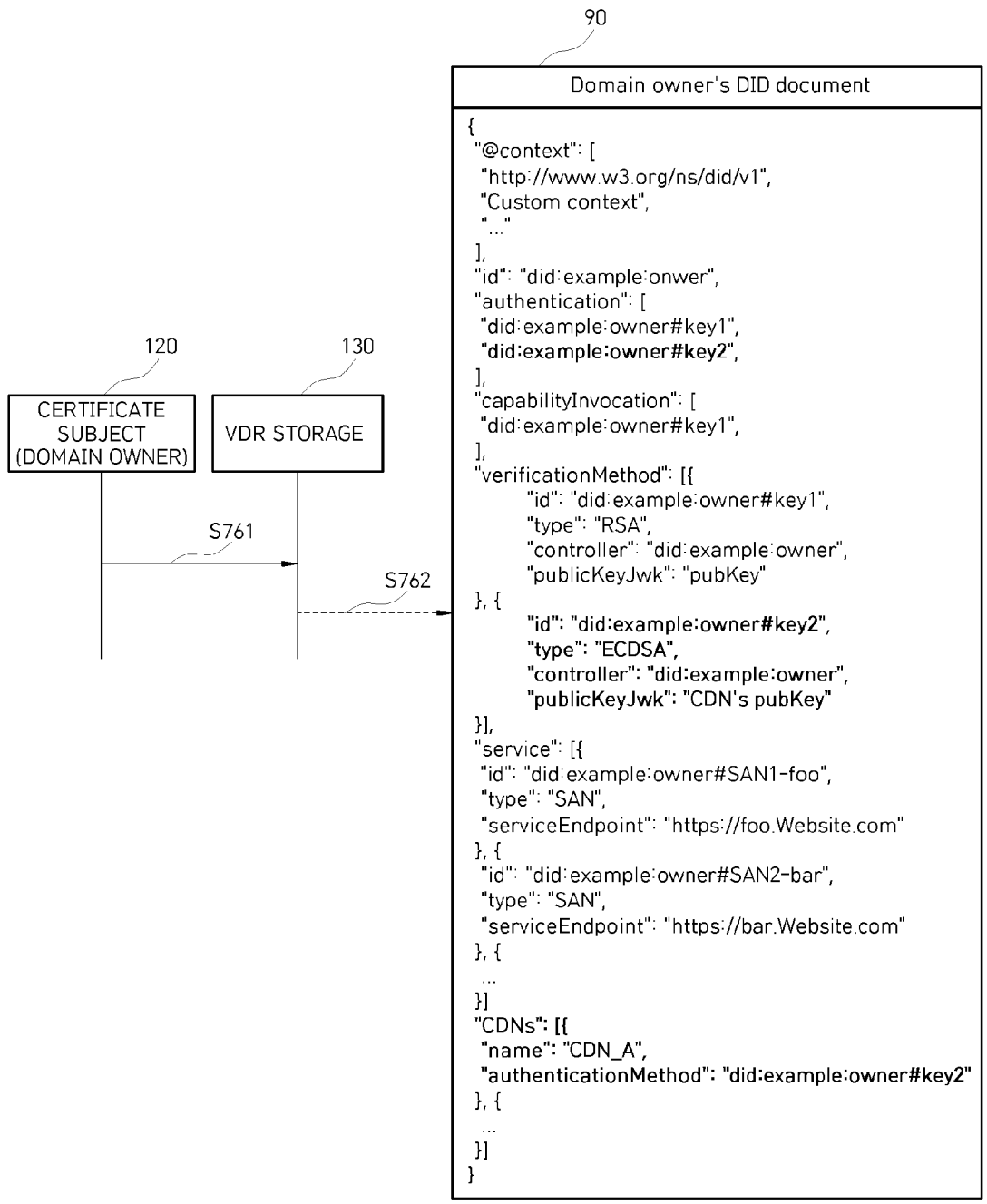
FIG. 14 is a flowchart of a message or information exchanged in a communication process between a certificate subject and a VDR storage in a step of rotating/deleting a public key of a certificate subject in a DID document illustrated in FIG. 8.

Step S760 of rotating/deleting public key of certificate subject and rotating SANs list FIG. 14 is a flowchart of a message or information exchanged in a communication process between a certificate subject and a VDR storage in a step of rotating/deleting a public key of a certificate subject in a DID document illustrated in FIG. 8.

Referring to FIG. 14, in an embodiment of the present invention, the certificate subject 120 or the VDR storage 130 may rotate and delete a public key used in authentication or a public key delegated to a proxy, based on a DID contract manager. At this time, the DID contract manager provided from the CA 110 may be installed in the certificate subject 120. Also, the certificate subject 120 may modify a service item and a CDNs item of a DID document and may add, modify, and delete a SAN item of an X.509 certificate also.

In an embodiment of the present invention, in a case where the VDR storage rotates and deletes the public key used in authentication or the public key delegated to the proxy, the certificate subject 120 may transfer a message, requesting rotation of the DID document, to the VDR storage 130 in step S751.

Subsequently, in step S762, in response to a message requesting rotation of the DID document, the DID contract manager of the VDR storage 130 may perform verification on an ownership of a private key corresponding to a public key specified in a capabilityInvocation field of the DID document 90 and an ownership of domains of a SANs list specified in a service field.

An ownership of the private key may be verified by a method such as POP specified an RFC 4210, a challenge & response method, or a method of hashing, by the certificate subject 120, the DID document to verify a value, signed with a private key, with a private key. An ownership of the domains may be verified by all methods, used in verifying an ownership of domains, such as DNSSEC, email, direct visit, and telephone. In addition, the CA 110 may add a cost charge function, needed in registering the DID document, to the DID contract manager, or may be affiliated with an external payment service and a DID contract manager and implemented.

As described above, the present invention may be designed based on DID standard, but a field name of a DID document (for example, authentication, capabilityDelegation, etc.) may be replaced by a different name. Also, in the present invention, a method of indirectly inserting a public key into a certificate may not exclude another means for replacing a DID.

Moreover, in the present invention, an example has been described where a DID replacing a public key is applied to an X.509-based certificate used in a web PKI (TLS) environment, but a DID (or a URL indicating a public key) replacing a public key may be applied to a certificate of a person such as a public certificate or an X.509-based certificate used in objects, tissues, or things.

Figure 15:
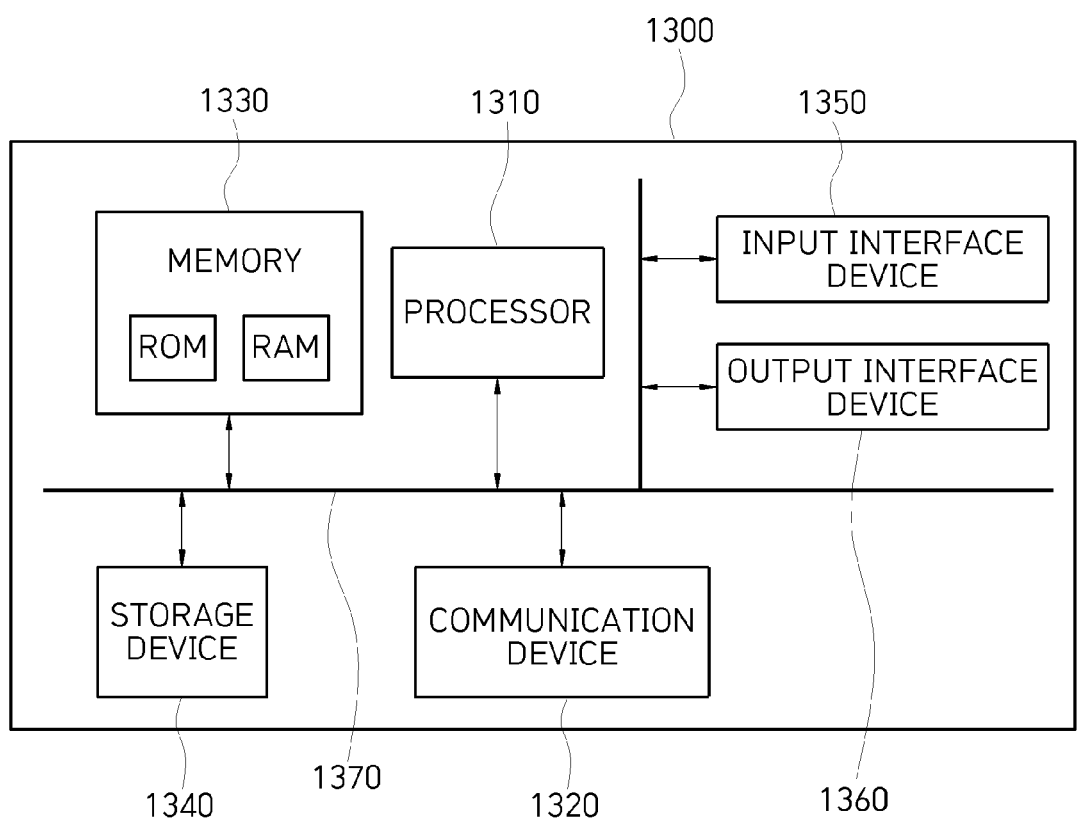
FIG. 15 is a block diagram illustrating a computer system for implementing a method according to an embodiment of the present invention.

FIG. 15 is a block diagram illustrating a computer system 1300 for implementing a method according to an embodiment of the present invention.

Referring to FIG. 15, the computer system 1300 may be an apparatus for implementing a method of managing authentication information of a certificate independently of a CA.

The computer system 1300 may include at least one of a processor 1310, a memory 1330, an input interface device 1350, an output interface device 1360, and a storage device 1340 which communicate with one another through a bus 1380. The computer system 1300 may include a communication device 1320 connected to a network. The processor 1310 may be a central processing unit (CPU), or may be a semiconductor device which executes an instruction stored in the memory 1330 or the storage device 1340. The memory 1330 and the storage device 1340 may include various types of volatile or non-volatile storage mediums. For example, the memory 1330 may include read only memory (ROM) and random access memory (RAM). In an embodiment of the present invention, the memory 1330 may be provided in or outside the processor and may be connected to the processor through various means known to those skilled in the art. The memory may be various types of volatile or non-volatile storage mediums, and for example, may include ROM or RAM.

Therefore, an embodiment of the present invention may be a method implemented in a computer, or may be implemented as a non-transitory computer-readable medium storing a computer-executable instruction. In an embodiment, when executed by the processor, the computer-readable instruction may perform a method according at least one aspect of the present invention.

The communication device 1320 may transmit or receive a wired signal or a wireless signal.

Moreover, the method according to an embodiment of the present invention may be implemented as a program instruction type capable of being performed by various computer means and may be stored in a computer-readable recording medium.

The computer-readable recording medium may include a program instruction, a data file, or a data structure, or a combination thereof. The program instruction recorded in the computer-readable recording medium may be specially designed for an embodiment of the present invention, or may be known to those skilled in the computer software art and may be used. The computer-readable recording medium may store may include a hardware device which stores and executes the program instruction. For example, the computer-readable recording medium may be a magnetic media such as a hard disk, a floppy disk, and a magnetic tape, an optical media such as CD-ROM or DVD, a magneto-optical media such as a floptical disk, ROM, RAM, or flash memory. The program instruction may include a high-level language code executable by a computer such as an interpreter, in addition to a machine language code such as being generated by a compiler.

According to the embodiments of the present invention, authentication information (for example, a private key requiring security) of a certificate subject may be managed independently of a CA by using the DID even without being exposed.

Moreover, according to the embodiments of the present invention, an authentication authority may be delegated to a proxy even without exposing a private key, and thus, the certificate subject may be supported to autonomously manage its own private key without reissuing a certificate, thereby enabling the instantaneous management of the authentication information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of managing authentication information of a certificate independently of a certificate authority (CA), the method comprising:
   issuing a certificate, into which identifier information instead of a public key is inserted, to an origin server by using the CA; and
   reading an identifier document from an external storage by using user equipment on a basis of the identifier information received from the origin server and verifying the certificate with the public key included in the identifier document,
   wherein the verifying of the certificate comprises:
      transmitting a first message, representing that it is possible to verify the certificate, to the origin server by using the user equipment; and
      transmitting a second message including the identifier information to the user equipment by using the origin server in response to the first message, and
   wherein the method further comprises:
      before the issuing of the certificate to the origin server, transferring software, managing the identifier document, to the external storage to install the software in the external storage by using the CA;
      generating the identifier document including the public key by using the origin server, based on a predetermined mode; and
      performing verification on an ownership of a private key corresponding to the public key included in the identifier document received from the origin server by using the software installed in the external storage.

2. The method of claim 1, wherein the issuing of the certificate to the origin server comprises:
   transferring the identifier information to the CA by using the origin server;
   verifying an ownership of the identifier information with the public key included in the identifier document from the external storage by using the CA, based on the identifier information;
   when the ownership of the identifier information is verified, inserting the identifier information into the certificate; and
   issuing the certificate, into which the identifier information is inserted, to the origin server.

3. The method of claim 2, wherein the verifying of the ownership of the identifier information comprises verifying the ownership of the identifier information with a public key specified in the identifier document.

4. The method of claim 2, wherein the inserting of the identifier information comprises inserting, instead of the public key, the identifier information into a Subject public key field of an X.509-based certificate.

5. The method of claim 2, wherein the inserting of the identifier information further comprises inserting type information, representing that the X.509-based certificate includes the identifier information instead of the public key, into a Public key algorithm field of the X.509-based certificate.

6. The method of claim 1, wherein the identifier information comprises URI information indicating the identifier document.

7. The method of claim 1, wherein the external storage comprises a decentralized storage or a distributed storage.

8. The method of claim 1, wherein the verifying of the certificate further comprises:
reading an identifier document from the external storage by using the user equipment, based on the identifier information included in the second message; and
verifying the certificate with the public key included in the identifier document by using the user equipment.

9. The method of claim 8, wherein the first message comprises a ClientHello message defined in The Transport Layer Security (TLS) Version 1.3, and the second message comprises a ServerHello message defined in the TLS Version 1.3.

10. The method of claim 1, further comprising:
when the ownership of the private key is verified, registering the identifier document by using the software installed in the external storage.

11. The method of claim 10, wherein the software provides a create, read, update, and delete (CRUD) function on the identifier document.

12. The method of claim 10, wherein the generating of the identifier document comprises generating the identifier document including a first field for recording the public key, a second field for recording a modification authority of the identifier document, and a third field recording a uniform resource locator (URL) of a web service provider.

13. The method of claim 10, further comprising transferring a registration request message of the identifier document by using the origin server, between the generating of the identifier document and the performing the verification on the ownership of the private key corresponding to the public key included in the identifier document,
wherein the registration request message comprises a value where a hash value of the identifier document is signed with a private key corresponding to a public key specified in the identifier document.

14. A method of managing authentication information of a certificate independently of a certificate authority (CA), the method comprising:
issuing a certificate, into which a decentralized identifier (DID) instead of a public key is inserted, to an origin server by using the CA;
reading a DID document from a data storage by using user equipment on a basis of the DID received from the origin server and verifying the certificate with the public key included in the DID document;
transferring a message, issuing a request to add, modify, or delete a public key included in the DID document, to the data storage by using the origin server; and
adding, modifying, or deleting the public key included in the DID document by using the data storage in response to the message,
wherein the verifying of the certificate comprises:
transmitting a first message, representing that it is possible to verify the certificate, to the origin server by using the user equipment; and
transmitting a second message including the identifier information to the user equipment by using the origin server in response to the first message, and
wherein the method further comprises:
before the issuing of the certificate to the origin server, transferring software, managing the identifier document, to the external storage to install the software in the external storage by using the CA;
generating the identifier document including the public key by using the origin server, based on a predetermined mode; and
performing verification on an ownership of a private key corresponding to the public key included in the identifier document received from the origin server by using the software installed in the external storage.

15. The method of claim 14, wherein the adding, modifying, or deleting the public key comprises adding, modifying, or deleting the public key included in the DID document by using the data storage, based on software providing a create, read, update, and delete (CRUD) function on the DID document.

16. The method of claim 14, wherein the DID comprises a URI indicating a position of the public key.

17. A system for managing authentication information of a certificate independently of a certificate authority (CA), the system comprising:
an origin server configured to receive a certificate based on public key infrastructure (PKI), into which a decentralized identifier (DID) instead of a public key is inserted, from the CA; and
a user equipment configured to read a DID document from a verifiable data registry (VDR) on a basis of the DID received from the origin server and verify the certificate with the public key included in the DID document,
wherein verification of the certificate comprises:
transmission of a first message, representing that it is possible to verify the certificate, to the origin server by using the user equipment; and
transmission of a second message including the identifier information to the user equipment by using the origin server in response to the first message, and
wherein, before reception of the certificate by the origin server,
the CA is configured to transfer software, managing the identifier document, to an external storage to install the software in the external storage,
the origin server is further configured to generate the identifier document including the public key based on a predetermined mode, and
the installed software in the external storage is configured to perform verification on an ownership of a private key corresponding to the public key included in the identifier document received from the origin server.

18. The system of claim 17, wherein the DID document comprises a first field with the public key recorded therein, a second field with a modification authority of the identifier document recorded therein, and a third field with a uniform resource locator (URL) of a web service provider recorded therein.

19. The system of claim 17, wherein the DID document comprises a uniform resource identifier (URI) indicating the DID document.

20. The system of claim 17, wherein the DID document comprises a uniform resource identifier (URI) indicating a position of the public key.

* * * * *